Nov. 2, 1943.　　　W. A. RINGLER　　　2,333,123
GABLE TOP CARTON
Filed Dec. 29, 1939　　　4 Sheets-Sheet 1
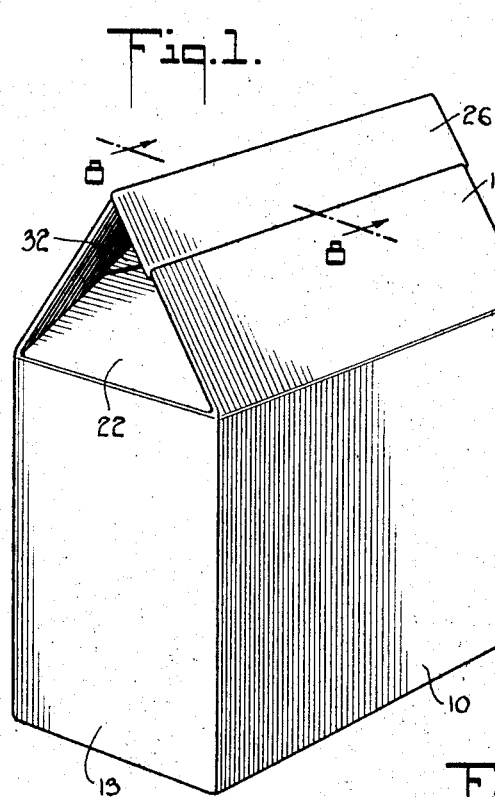
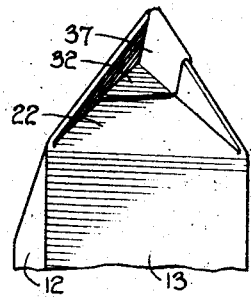
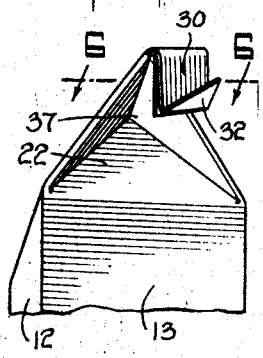
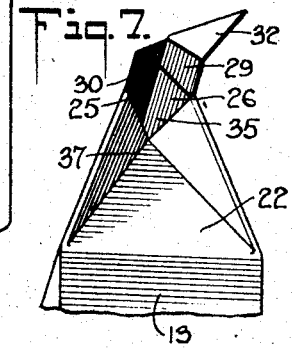
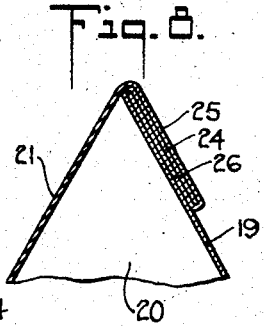
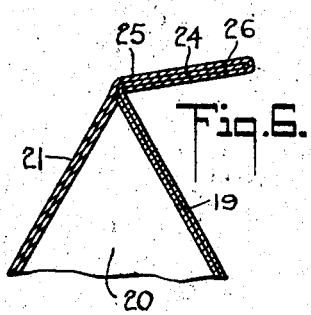
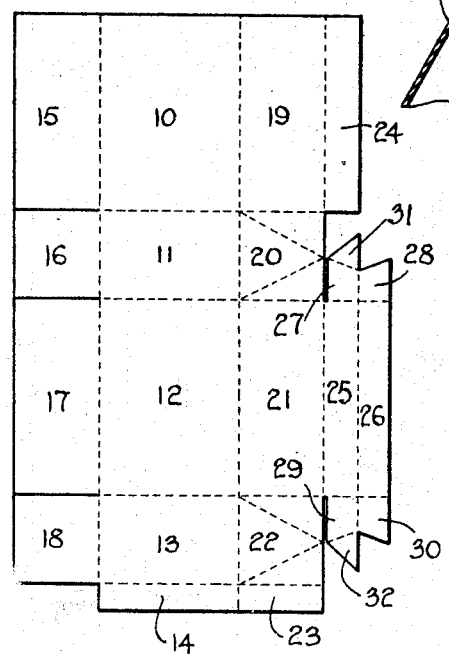
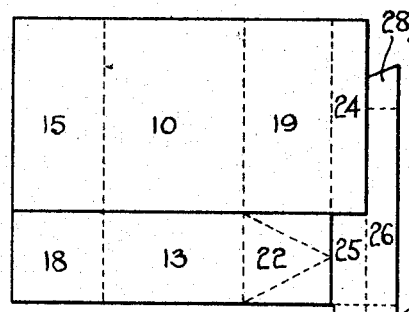
INVENTOR
William A. Ringler
BY Henry J. Rucke
HIS ATTORNEY Nov. 2, 1943.　　　W. A. RINGLER　　　2,333,123
GABLE TOP CARTON
Filed Dec. 29, 1939　　　4 Sheets-Sheet 2
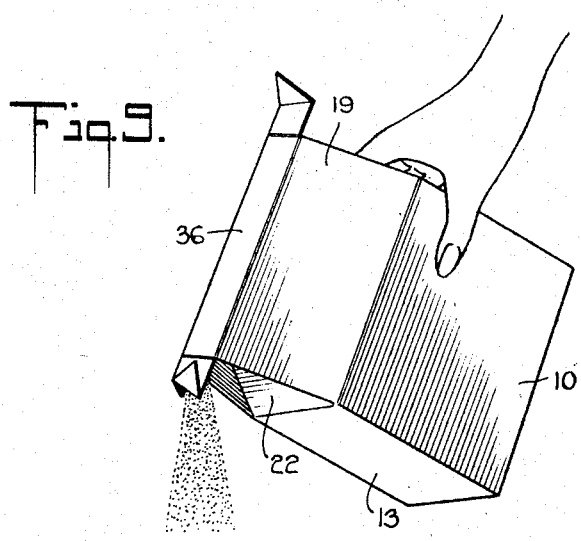
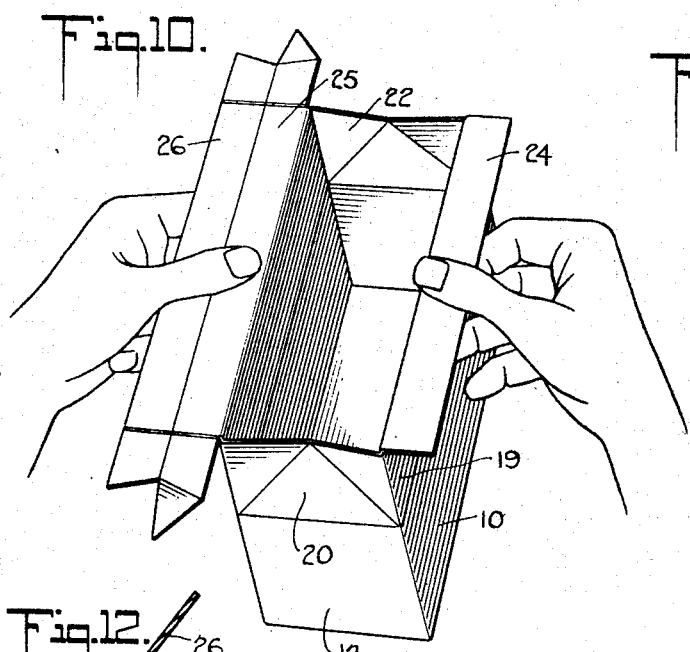
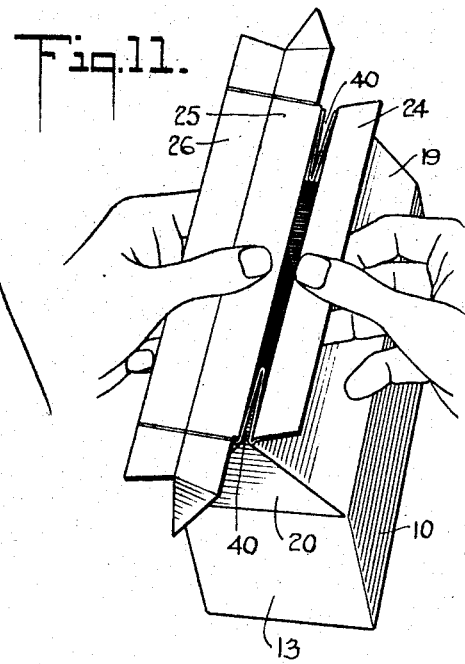
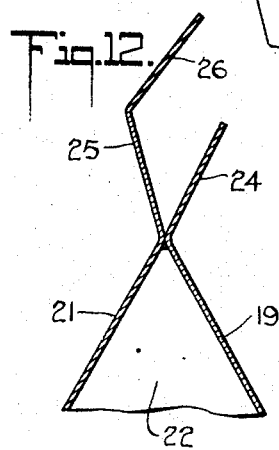
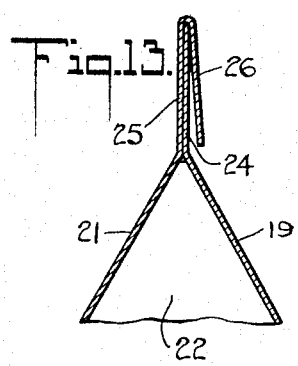
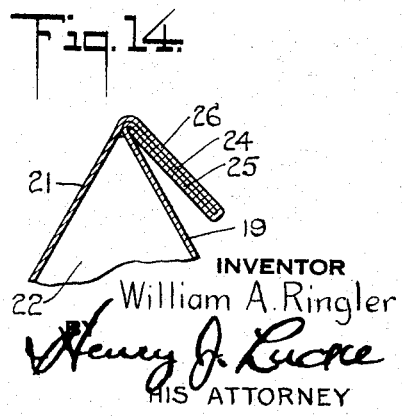
INVENTOR
William A. Ringler
Henry J. Lucke
HIS ATTORNEY Nov. 2, 1943.  W. A. RINGLER  2,333,123
GABLE TOP CARTON
Filed Dec. 29, 1939  4 Sheets-Sheet 3

INVENTOR
William A. Ringler
BY
Henry J. Lucke
HIS ATTORNEY

Nov. 2, 1943.  W. A. RINGLER  2,333,123
GABLE TOP CARTON
Filed Dec. 29, 1939   4 Sheets-Sheet 4
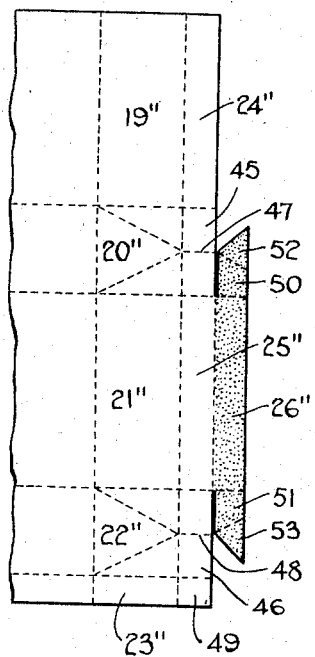
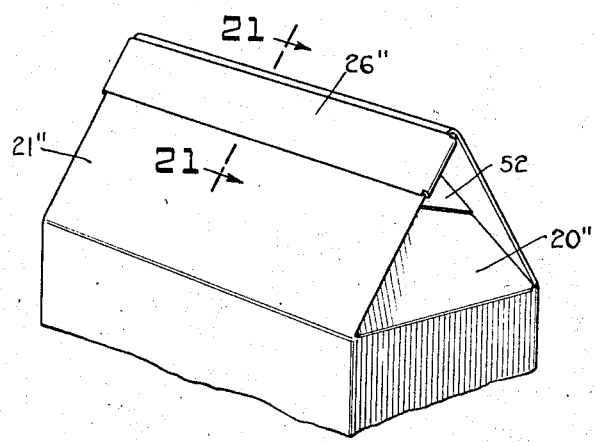
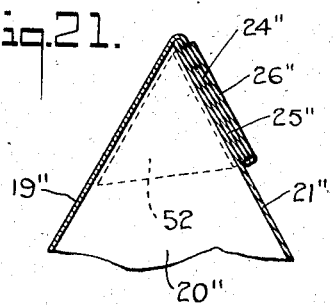
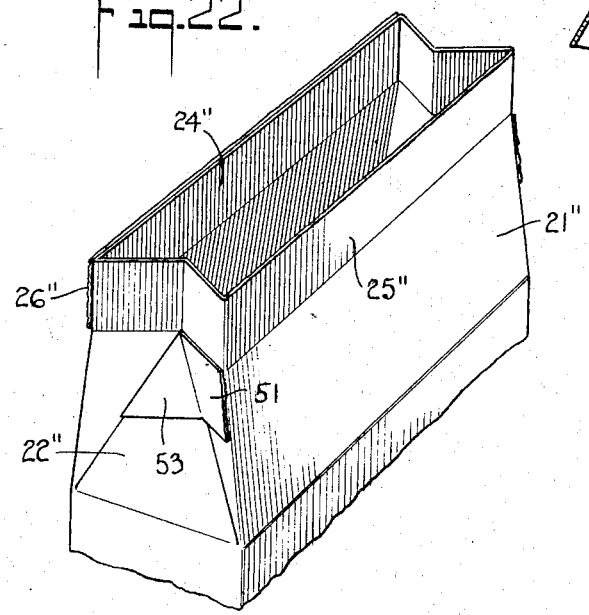
INVENTOR
William A. Ringler
BY
Henry J Lucke
HIS ATTORNEY Patented Nov. 2, 1943

2,333,123

UNITED STATES PATENT OFFICE 2,333,123

GABLE TOP CARTON

William A. Ringler, Wayne, Pa., assignor to National Folding Box Company, New Haven, Conn., a corporation of New Jersey Application December 29, 1939, Serial No. 311,459

4 Claims. (Cl. 229—37)

This invention relates to folding boxes, and particularly to folding boxes of the carton type employed for packaging individual portions of merchandise for marketing.

The invention was especially developed and is ideally adapted to the packaging of finely ground merchandise such as coffee, sugar, cereals, etc. which tend to sift from any container not very carefully sealed. Heretofore, bags with various types of tight closure means have been most successfully employed for the packaging of such materials. While, in certain instances, features of this invention may be employed to advantage in so called paper bags, preferred embodiments of the invention are definitely folding boxes having all the advantageous characteristics thereof.

An object of the invention, then, is the provision of a foldable substantially sift-proof container having improved structural characteristics.

An object is the provision of a substantially sift-proof container of folding box construction which may be easily and economically set up from knock down condition and which may be opened for the discharge of contents and tightly reclosed thereafter, conveniently and without damage thereto.

An object is the provision, in a sift-proof container as specified above, of an arrangement of structure which form pouring spouts when the container is opened for the discharge of contents.

An outstanding feature of the invention resides in gable-forming structure having bellows ends, and having closure elements especially adapted for cooperation with the bellows ends.

The closure elements may be loosely arranged for cooperation in closing the container, and in thus forming the gable structure; they may be permanently secured together in approximately gable formation leaving only relatively small end openings open for closure and re-closure as desired; or they may be permanently secured in gable formation necessitating cutting or tearing to open the container.

Where the container is a folding box, certain of the closure elements may form flap extensions of the ridge portion of the gable structure, projecting out over the above mentioned relatively small end openings, the ridge portion being so arranged that it can be pinched together to close the end openings, that it can be folded downwardly upon one side of the slanting top area, and that it can be secured in such closed position by friction fit of the flap extensions within the top parts of the cavities formed by the bellows ends.

Then, when it is desired to open the box, the flap extensions are pulled out from their frictional engagement with the bellows ends to form discharge openings topped by spout-like formations which are adapted for guiding flow of contents from the box.

While embodiments of the invention are particularly useful for the packaging of materials which have a tendency to sift from containers, their peculiar structural characteristics adapt them for use to advantage in many other instances.

Further features and objects of the invention will be apparent from the following detailed description and accompanying drawings.

In the drawings:

Fig. 1 illustrates, in perspective, a set up folding box representing a preferred embodiment of the invention.

Fig. 2 represents a top plan view of the cut and creased blank prepared for use in forming the folding box.

Fig. 3 represents a view of the folding box in knock down condition, the blank of Fig. 2 being folded upon itself and appropriately secured to place the embodiment in such knock down form originally.

Fig. 4 is a fragmentary perspective view representing one end of the gable top portion of the folding box.

Fig. 5 is a view similar to that of Fig. 4, but representing the gable top portion in the initial stage of being opened for the discharge of contents.

Fig. 6 represents a vertical section taken on the line 6—6, Fig. 5.

Fig. 7 is a view similar to those of Figs. 4 and 5, but illustrating the gable top portion in its final opened stage.

Fig. 8 represents a vertical section taken on the line 8—8 of Fig. 1.

Fig. 9 represents a perspective view of the set up folding box in use, the view illustrating contents discharging from one of the relatively small discharge openings of the gable structure.

Fig. 10 represents a top perspective view of the embodiment of Fig. 1 as it appears fully open at the top for the reception of contents.

Fig. 11 represents a view corresponding to that of Fig. 10 but illustrating the gable forming structure partially closed by hand.

Fig. 12 represents a fragmentary vertical section through the gable forming structure at a stage subsequent to that of Fig. 11.

Fig. 13 is a view similar to that of Fig. 12 but illustrating a subsequent stage of the closing operation.

Fig. 14 is a view similar to those of Figs. 12 and 13 but illustrating yet a later stage of the closing operation.

Fig. 19 is a fragmentary view, in top plan, of the gable-top-forming portion of a blank prepared for forming still another embodiment of folding box according to the invention.

Fig. 20 is a fragmentary view in perspective representing the gable top portion of a folding box set up from the blank of Fig. 19 and completely sealed in closed condition.

Fig. 21 represents a fragmentary vertical section taken on the line 21—21, Fig. 20.

Fig. 22 is a view corresponding to that of Fig. 20, but illustrating the set up folding box as fully opened for the discharge of contents.

Figure 15:
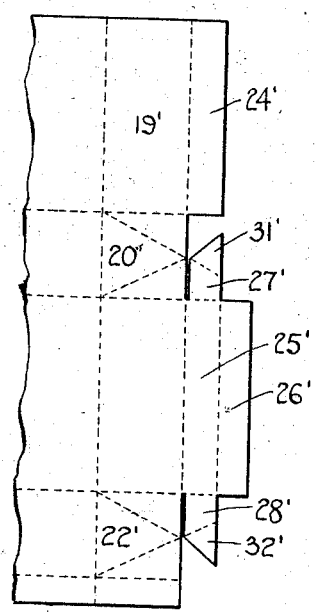
Fig. 15 is a fragmentary view representing, in top plan, the gable-top-forming portion of a blank prepared for forming another embodiment of folding box according to the invention.

A characteristic structural feature of the invention resides in an arrangement of opposite bellows ends and closure elements, adjacent the opening of the container.

In preferred forms, this structural feature results in the formation of a gable top capable of being opened to afford discharge of contents and thereafter closed to preserve any contents that may remain.

That preferred form of folding box illustrated in Fig. 1 is made up from a blank of suitable sheet material, such as paper board stock, which has been cut and creased in a predetermined manner especially for the purpose.

The blank is illustrated per se in Fig. 2. It comprises the series of integrally connected panel sections 10, 11, 12, 13, and 14 which form a side wall, an end wall, a similar side wall, a similar end wall, and a glue flap, respectively of the ultimate box. The panel sections are marked off by suitably provided lines of crease.

Side by side and integral with this series of sections is formed another series of panel sections 15, 16, 17 and 18, which, collectively, form the bottom of the ultimate box. This series of panel sections is marked off from the first series by suitably provided lines of crease, and the individual panels or sections thereof are separated from one another by cut lines.

Side by side and integral with the first series of sections, and on the side opposite the second series of sections, is provided a third series of integrally connected panel sections 19, 20, 21, 22 and 23, which form a slanting top wall, a bellows end, a similar slanting top wall, a similar bellows end, and a glue flap, respectively, of the ultimate carton. The sections are marked off by suitably provided lines of crease, and the sections 20 and 22, which form bellows ends, are provided with diagonal lines of crease forming preferably isosceles triangles in the blank, effective to produce the bellows formations.

Side by side and integral with the section 19 is a section 24 which may be a glue flap if desired, or may be merely a free, closure-supporting flap. Side by side and integral with the section 21 is an assembly of top closure sections, comprising side-by-side intermediate sections 25 and 26, groups, respectively, of side-by-side opposite end sections 27 and 28, and 29 and 30, and opposite end tabs 31 and 32, respectively.

The related intermediate sections 25 and 26 form the ridge, and the opposite groups of end sections, 27, 28 and 31, and 29, 30 and 32, form closure locking members of the gable top portion of the ultimate box.

The prepared blank of Fig. 2 is folded upon itself, as illustrated in Fig. 3, and the flap portions 14 and 23 glued or otherwise secured to the opposite end of the blank. The folding box is then in knock down form, needing only to be set up by appropriate procedure to form the embodiment of Figs. 1 and 4 through 9, or the embodiment of Figs. 10 through 14.

The illustrated embodiments are provided with bottom panels adapted to be glued together to form a substantially sift-proof bottom. Accordingly, the folding box, when once set up, cannot be collapsed into knock-down form without serious damage thereto. In other embodiments of the invention, however, it is contemplated that any type of bottom closure may be provided, there being a great number of conventional types which may be selected in the particular instance. Among these may be embodiments which are capable of complete collapse from set up to knock-down form, repeatedly, without damage to the box.

The bottom panels 15, 16, 17 and 18 may be glued together by placing the box, at the stage immediately following that illustrated in Fig. 3, over a bottom sealer. In the instances of embodiments having other types of bottom panels and bottom panel securement, appropriate methods of securement may be employed.

The top portion of the thus partially set up box, comprising cooperative cover sections extending between and disposed at opposite sides of the bellows ends, is folded into gable formation during the closing operation, the box preferably being filled prior thereto.

As aforesaid, the flap 24 may be a glue flap, which is glued by hand or machine, to the undersurface of intermediate section 26 to make the gable formation permanent. It may, however, be secured to the intermediate section 26 in any other suitable manner, as for instance, by stapling.

The box will then be in the stage illustrated in Fig. 7, that is, with relatively small openings, see the opening 35, Fig. 7, formed above the bellows at opposite ends of the ridge portion 36 of the gable top. It is contemplated that these openings will be found useful for discharging contents of the box, either all at one time, or portions thereof from time to time. In the latter instance, the nature of the construction of the box enables a substantially sift-proof reclosure to be made following each discharge of contents.

It should be noted that the opposite groups of end sections, 27, 28 and 31, and 29, 30 and 32, when in open position form, in effect, pouring spouts for guiding the discharge of contents from the box, see especially Fig. 9.

In closing the gable top of the box from time to time, following discharge of portions of the contents during use of the box, the intermediate sections 25 and 26 are pinched together and folded downwardly upon, see Figs. 5 and 6, and against, see Figs. 1, 4 and 8, one of the sloping sides of the gable top portion.

The thus closed structure is locked in closed position by tucking the opposite groups of end sections 27, 28 and 31, and 29, 30 and 32, in the cavities, see cavity 37, formed by the bellows ends 20 and 22, as they close. The locking tabs 31 and 32 are so configurated as to tightly fit, frictionally, between the walls of the cavities at the top portions thereof, see particularly Fig. 4.

As thus tightly closed and locked, the gable top portion of the box is substantially sift-proof, and is well safeguarded against accidental opening. In addition, the closed box presents a neat and symmetrical appearance.

When it is desired to open the box for the discharge of contents, it is only necessary to lift up the locking tabs 31 and 32 and pull them, together with their associated end sections 27 and 28 and 29 and 30, respectively, into the position illustrated in Fig. 5. The closure structure may then be opened out to form the ridge portion 36. Contents of the box may be discharged through the relatively small openings at the ends of the ridge portion and, thereafter, if desired, the closure structure may be re-closed in the form illustrated in Figs. 1, 4 and 9.

The flap 24 need not be glued or otherwise secured to the intermediate section 26, but may be merely associated therewith in the role of a closure-supporting flap. Therefore, the box may be used as is a paper bag.

In such use of the box, the assembly of closure sections and the closure flap are grasped, as illustrated in Fig. 10, and pulled outwardly to expand the bellows ends 20 and 22, and, thus, to prepare the box for filling.

Following the filling operation, the sides of the gable structure are pushed together, as illustrated in Fig. 11, thus folding the bellows ends inwardly and placing the assembly of closure sections and the closure flap in juxtaposition.

It should be noted that the top edges of the bellows ends are arranged in substantially V formation, indicated 40, 40, respectively, Fig. 11, during the closing operation, and wedge together from the inside of the box toward the outside thereof as the intermediate section 25 comes face to face with the closure flap 24, see Fig. 12.

The closure section 26 is then folded down over closure flap 24, see Fig. 13, and the thus folded closure elements are collectively folded downwardly against the slanting top wall 19 of the box, see Fig. 14. It should be noted that the top wall 19 is the one to which closure flap 24 is secured.

From an inspection of Fig. 14, it can be readily seen that the last mentioned operation wedges the apex portions of the slanting top walls 19 and 21 tightly together over the entire length of the gable structure of the box, and, perticularly so, adjacent the end portions thereof where the top edges of the respective bellows ends meet.

The gable top portion of certain embodiments of the invention, may be completely sealed following the filling of the container.

In Figs. 15 through 18 is illustrated a form of folding box particularly adapted for complete sealing.

A blank, see Fig. 15, is formed in the same manner as is the blank illustrated in Fig. 2, preferably with the same type of bottom-forming portion. The blank may be identical with that of Fig. 2 with the exception that the intermediate closure section, here designated 26', lacks the opposite end tab sections which are designated 28' and 30' in the blank of Fig. 2.

This form of folding box is set up from the blank of Fig. 15 in the same manner as is the folding box of Fig. 10 from the blank of Fig. 2. In closing the gable top structure, however, the outer face of closure flap 24' and the inner faces of the opposite end sections 27' and 28' and opposite end tabs 31' and 32' are coated with adhesive, preferably by running the set up folding box through a suitable automatic adhesive applicator. Intermediate closure section 26' is then folded down against the adhesive coated outer face of closure flap 24'; the thus assembled intermediate closure sections 25' and 26' and closure flap 24' are thereupon folded downwardly against the sloping top wall 19' of the gable top structure, and the opposite end sections 27' and 28' and end tabs 31' and 32' are tucked into the cavities formed by the opposite bellows ends 20' and 22'. The adhesive coated inner surfaces of opposite end sections 27' and 28' and the opposite end tabs 31' and 32' adhere tightly to the cavity-defining walls of the bellows ends to complete sealing of the closure.

Figure 17:
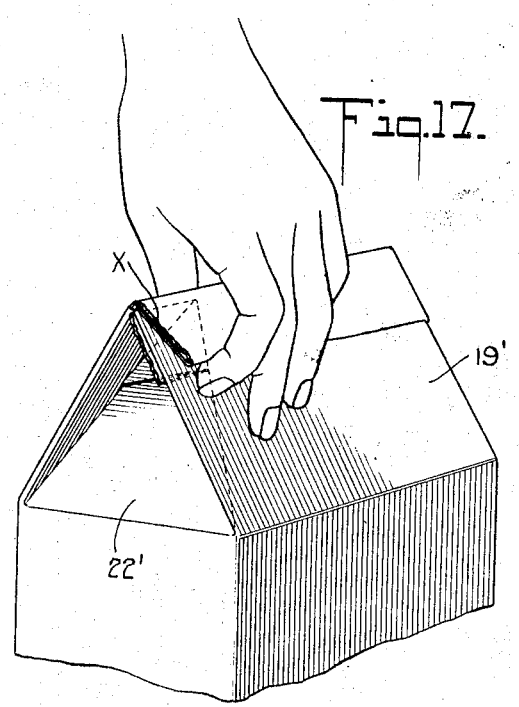
Fig. 17 is a fragmentary view corresponding to that of Fig. 16, but illustrating the set up folding box fully sealed and in the process of being opened.
Figure 18:
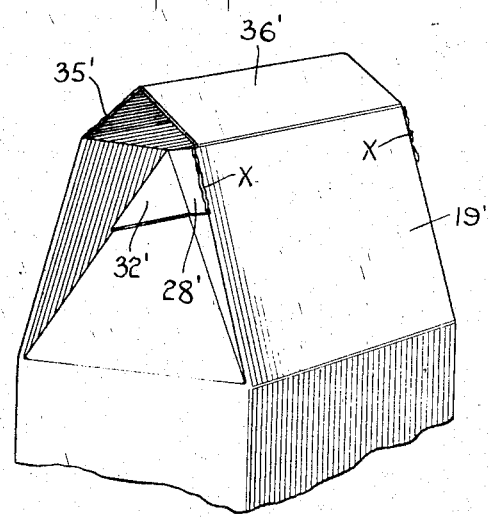
Fig. 18 is a fragmentary view corresponding to those of Figs. 16 and 17, but illustrating the folding box opened for the discharge of contents.

The folding box, tightly sealed as above, may be opened in the manner illustrated in Fig. 17 by forcibly pulling up the assembly of intermediate closure elements and closure supporting flap from its position against the face of sloping top wall 19', the said assembly of closure elements being thus torn from the tucked-in opposite end sections, see X, Fig. 17.

As thus opened, the gable top of the folding box will have its ridge portion 36' provided with opposite, relatively small, discharge openings 35'.

While this embodiment of the invention, when once opened cannot be returned to its original sift-proof condition, it may be closed for all practical purposes by folding the assembly of closure elements once more down against the sloping top wall 19' and retaining such assembly in such position by means of ordinary paper clips or other suitable securing devices.

In other embodiments of the invention, the opposite bellows ends of the gable top portion may be extended upwardly, approaching, or completely in, alignment with certain of the closure sections.

A blank, see Fig. 19, is formed in substantially the same manner as are the blanks of Fig. 2 and Fig. 15, preferably with the same type of bottom-forming portion. In many respects the blank of Fig. 19 is similar to those of Figs. 2 and 15, and, therefore, like parts are indicated by like numerals with the addition thereto merely of double primes.

Here, there are opposite bellows ends 20'' and 22'', slanting top walls 19'' and 21'', a closure flap 24'', and side-by-side intermediate closure sections 25'' and 26'', as is true in the cases of the blanks of Figs. 2 and 15.

A difference, however, resides in the fact that the opposite end sections 27 and 28 and opposite end tabs 31 and 32 are eliminated as independent entities, and the bellows ends 20' and 22' are extended upwardly, as for instance, at 45 and 46. These upper sections of the bellows ends are provided with crease lines 47 and 48, respectively, corresponding in position to the apex of the isosceles-triangle-forming crease lines of the bellows ends, and contract and expand in substantially the same manner, in the closing and opening of the box, as do the bellows ends proper. In view of the extension of the bellows ends, there is provided a corresponding extension 49 to the glue flap 23''.

A further difference resides in the opposite end sections attached to intermediate closure section 26''. Opposite end sections 50 and 51 and opposite end tabs 52 and 53, corresponding to the opposite end sections 27 and 28 and opposite end tabs 31 and 32, which are attached to the intermediate closure section 25 of the blank of Fig. 2, are here attached to intermediate closure section 25''. These opposite end sections and tabs attached to intermediate closure section 26'' provide the means for locking the gable top portion in closed position.

Figure 16:
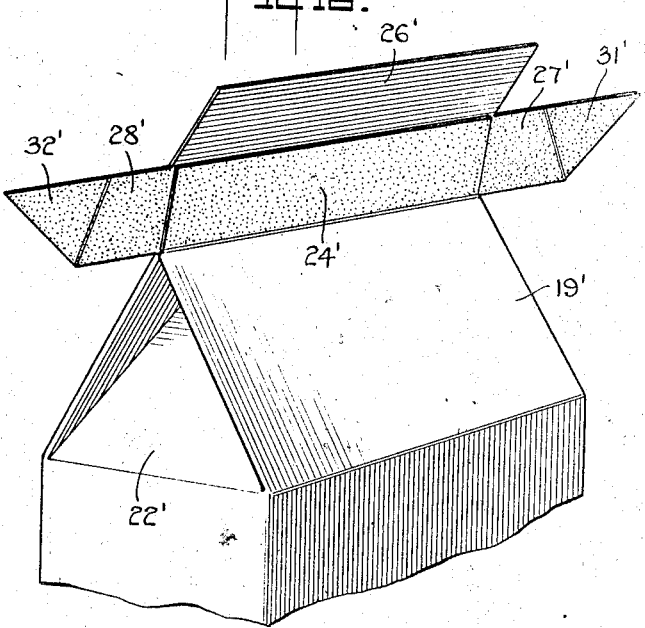
Fig. 16 is a fragmentary view representing, in perspective, the gable top portion of the folding box set up from the blank of Fig. 15, the view illustrating an intermediate stage during the sealing of the closure portion thereof.

The inside face of intermediate closure section 26'' and the inside faces of opposite end sections 50 and 51 and opposite end tabs 52 and 53 may be coated with adhesive in the blank stage for later moistening, or may be coated with adhesive in somewhat the same manner as in the case of the set up folding box of Fig. 16. In any case, however, in closing the set up box, the inside face of intermediate closure section 26'' is glued against the outside face of closure flap 24''. The thus assembled closure elements are then folded down against the sloping wall 21'' of the gable top portion of the box, and the opposite end sections 50 and 51 and the opposite end tabs 52 and 53 are tucked within the cavities formed by the contracted bellows ends and are glued to the walls thereof, see Fig. 20. It should be noted that, in this instance, the assembly of closure elements is folded down oppositely to that of the prior embodiments.

The resulting closed carton is very tightly sealed, and, by reason of the extensions 45 and 46 of the bellows ends, even greater security against sifting is obtained than in the prior embodiments.

The sealed carton of Fig. 20 may be opened in the manner illustrated in Fig. 17 in connection with the immediately prior embodiment. But, because of the extensions 45 and 46 of the bellows ends, no relatively small discharge openings will be formed at the ridge portion. Accordingly, the ridge portion should be slit lengthwise for fully opening the gable top portion as illustrated in Fig. 22. Of course, if the sections 45 and 46, which extend the bellows ends, are made of lesser length or are notched substantially centrally, relatively small discharge openings may be formed nevertheless.

If desired, the embodiment of Figs. 19 through 22 may be left unglued. In that event, the assembly of closure elements should be folded downwardly against sloping top wall 19'', as is the case in the prior embodiments. Opposite end tabs 52 and 53 will then lock frictionally in the cavities formed by the contracted bellows ends.

Should thin paper or similar material be employed for producing containers resembling paper bags, the features of embodiments illustrated in Figs. 15 through 22 are most advantageously employed.

Whereas this invention has been illustrated and described with respect to preferred forms thereof, it is to be distinctly understood that many changes may be made without departing from the generic scope of the invention as set forth herein and in the following claims.

I claim:

1. A folding box comprising gable structure adapted to be opened and closed; said gable structure including substantially rectangular side panels having a free edge, said panels being foldable inwardly to form opposite generally triangular inwardly extending bellows ends in which the free edge of said initially substantially rectangular panel is doubled upon itself in the closing operation to form the apex of said bellows ends, panels extending between and interconnecting said bellows ends to form slanting top walls of said gable structure, a closure flap hingedly secured to one of said top-wall panels, a closure flap secured to said other top wall panel and foldable over said first-named closure flap to be in contact with both sides thereof, said closure flaps being collectively foldable into contact with a surface of one of said top wall panels to close the box and tab means at each end of said closure flaps and hingedly secured thereto, each said tab means being foldable into its adjacent bellows end and having a configuration corresponding to the configuration of the apex portion of said bellows ends to wedge therein for securing said closure flaps against said top wall panel.

2. A blank for use in forming a folding box having a gable top, comprising, seriatim, a side wall forming section having a transverse fold line, an end wall forming section scored along angularly disposed lines converging to an apex at the free end thereof to permit said end wall section to be folded inwardly to form a generally triangular bellows end, a similar side wall forming section, and a similar end wall forming section; a closure flap coextensive with one of said side wall forming sections and hingedly secured thereto, and a group of closure flaps comprising an elongate narrow panel coextensive with the other side wall forming section and hingedly thereto and a second elongate narrow panel hingedly joined to said first panel, one of said panels having a tab portion extending from each end thereof, for a distance greater than one half the width of said end wall sections, the free end of each of said tab portions being cut on an angle, and said tab portions being scored at an angle with respect to said free end and intersecting said free end to provide a fold line therefor; the free ends of said tab portion and said fold line being substantially in line with the respective above mentioned lines of scoring of an end wall section when the blank is in flat status.

3. A rectangular folding box having side and end wall panels and closure structure comprising opposite inwardly folding bellows ends formed from substantially rectangular panel sections located at the upper part of the end panels and being provided with lines of scoring extending from the extremities of said panel sections at the bottom thereof to intersect at the center of the upper edge of said panel sections, and having vertical fold lines defining the side edges of said panel sections, whereby said end panel sections may be folded inwardly to define triangular end cavities characterized by convergent side walls and an upstanding triangular end wall; said side panels having their upper ends converging inwardly and upwardly into contacting relationship at their respective upper edges, each of the side wall panels having a fold line adjacent the upper edge of said panel section, said fold line serving to integrally and foldably connect cover sections thereto; said cover sections foldable one over the other to form a closed ridge extending between said bellows ends, and closure tabs integral with the opposite ends of certain of said cover sections, said closure tabs having a triangular configuration of which the apex angle is substantially equal to the apex angle of said triangular end wall, said closure tabs being foldable into said end cavities to lie against the triangular end wall portion thereof in frictional engagement with the side walls of said end cavities.

4. A folding box as defined in claim 3, further characterized by one of said side panels having but one integrally and foldably connected cover section and said second side panel having parallel score lines to provide a cover section equal in length and width to the cover section of the first-named side panel and a second integral cover section coextensive with its associated cover section and having a width substantially equal thereto, said second named cover section overlying and being secured to the surface of the cover section of the first named side panel, whereby the said side panels may be brought out of their normally contacting edge relationship to an extent permitted by such secured cover sections to provide openings for the discharge of the contents of the box.

WILLIAM A. RINGLER.